(12) United States Patent
Gorbatov et al.

(10) Patent No.: US 7,861,068 B2
(45) Date of Patent: Dec. 28, 2010

(54) METHOD AND APPARATUS FOR USING DYNAMIC WORKLOAD CHARACTERISTICS TO CONTROL CPU FREQUENCY AND VOLTAGE SCALING

(75) Inventors: Eugene Gorbatov, Hillsboro, OR (US); Sameer Abhinkar, Beaverton, OR (US); Andrew Henroid, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 11/370,254

(22) Filed: Mar. 7, 2006

(65) Prior Publication Data

US 2008/0235364 A1  Sep. 25, 2008

(51) Int. Cl.
*G06F 1/32* (2006.01)
(52) U.S. Cl. .................................... 712/220
(58) Field of Classification Search ............ None
See application file for complete search history.

(56) References Cited

U.S. PATENT DOCUMENTS

| 5,745,375 | A | | 4/1998 | Gunther et al. |
| 5,768,500 | A | * | 6/1998 | Agrawal et al. ............... 714/47 |
| 5,822,598 | A | | 10/1998 | Lam |
| 5,881,306 | A | * | 3/1999 | Levine et al. ................. 712/23 |
| 5,887,179 | A | | 3/1999 | Zmora et al. |
| 5,940,785 | A | * | 8/1999 | Georgiou et al. ............ 702/132 |
| 6,065,069 | A | | 5/2000 | Klein et al. |
| 6,216,233 | B1 | | 4/2001 | Baweja |
| 6,282,663 | B1 | | 8/2001 | Khazam et al. |
| 6,360,337 | B1 | * | 3/2002 | Zak et al. ...................... 714/47 |
| 6,556,952 | B1 | * | 4/2003 | Magro ......................... 702/183 |
| 6,792,617 | B2 | | 9/2004 | Gorbatov et al. |
| 7,315,795 | B2 | * | 1/2008 | Homma ....................... 702/182 |
| 7,475,262 | B2 | * | 1/2009 | Banginwar et al. .......... 713/300 |

(Continued)

FOREIGN PATENT DOCUMENTS

| EP | 1363180 A2 | 11/2003 |
| GB | 2395309 A | 5/2004 |
| GB | 2406184 A | 3/2005 |
| WO | 03027819 A3 | 4/2003 |
| WO | 2007/103051 A2 | 9/2007 |
| WO | 2007/103051 A3 | 11/2007 |

OTHER PUBLICATIONS

Choi, K., etal., Dynamic Voltage and Frequency Scaling based on Workload Decomposition, 2004,ACM,pp. 174-179.*

(Continued)

*Primary Examiner*—Eric Coleman
(74) *Attorney, Agent, or Firm*—Paul E. Steiner

(57) ABSTRACT

An electronic system may include a memory storing processor-executable program code and a processor in communication with the memory and operative in conjunction with the stored program code to determine a number of retired instructions and a number of input/output queue events for a workload and to determine if a performance characteristic is within a desired performance range based at least in part on the number of retired instructions and the number of input/output queue events. If the performance characteristic is within the desired performance range, the processor may be further operative in conjunction with the stored program code to determine an amount of time on die and an amount of time off die for the workload, to determine if a phase shift occurred based on the amount of time on die and the amount of time of die, and, if the phase shift occurred, to determine a new target frequency for a processor to execute the workload.

8 Claims, 8 Drawing Sheets

U.S. PATENT DOCUMENTS

| | | |
|---|---|---|
| 2003/0058853 A1 | 3/2003 | Gorbatov et al. |
| 2003/0120961 A1 | 6/2003 | Cooper |
| 2004/0098631 A1* | 5/2004 | Terrell, II .................. 713/322 |
| 2005/0132238 A1* | 6/2005 | Nanja ......................... 713/300 |
| 2005/0177327 A1 | 8/2005 | Banginwar et al. |
| 2005/0181840 A1 | 8/2005 | Banginwar et al. |
| 2005/0190714 A1 | 9/2005 | Gorbatov et al. |
| 2005/0289360 A1 | 12/2005 | Banginwar et al. |
| 2006/0282878 A1 | 12/2006 | Stanley et al. |
| 2007/0005966 A1 | 1/2007 | Aissi et al. |
| 2007/0006281 A1 | 1/2007 | Abhinkar et al. |
| 2007/0008887 A1 | 1/2007 | Gorbatov et al. |
| 2007/0011480 A1 | 1/2007 | Banginwar et al. |

OTHER PUBLICATIONS

International Search Report/Written Opinion received for PCT application No. PCT/US2007/005021, Mailed on Aug. 24, 2007, 58 Pages.

International Preliminary report on Patentability for PCT application No. PCT/US2007/005021, Mailed on Sep. 18, 2008, 8 pages.

Choi, K, et al. Fine-Grained Dynamic Voltage and Frequency Scaling for Precise Energy and Performance Trade-Off Based on the Ratio of Off-Chip Access to On-Chip Computation Times, Dept. of EE-Systems, University of Southern California, Los Angeles, CA, (6 pages).

* cited by examiner

US 7,861,068 B2

METHOD AND APPARATUS FOR USING DYNAMIC WORKLOAD CHARACTERISTICS TO CONTROL CPU FREQUENCY AND VOLTAGE SCALING

The invention relates to power management. More particularly, some embodiments of the invention relate to a method and apparatus for using dynamic workload characteristics to control CPU frequency and voltage scaling.

BACKGROUND AND RELATED ART

A central processing unit (CPU) may consume a significant amount of power during operation. Some conventional systems provide for operation of CPUs in one or more selectable performance states. For example, a CPU may be selectively controlled to operate at a first frequency and a first voltage (i.e., a first performance state) or at a higher frequency and higher voltage (i.e., a second performance state). The CPU may therefore consume less power in the first performance state than in the second performance state.

Determination of a CPU performance state is typically based only on a percentage utilization of the CPU. The CPU may be controlled to operate in a low performance state if the percentage utilization is below a threshold level, and in a higher performance state if the percentage utilization is above a threshold level. Systems that may provide more efficient operation are desirable.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

This application is related to U.S. patent application Ser. No. 11/169,975, filed Jun. 29, 2005, entitled "Processor Power Management," the entire contents of which is hereby incorporated by reference.

Figure 1:
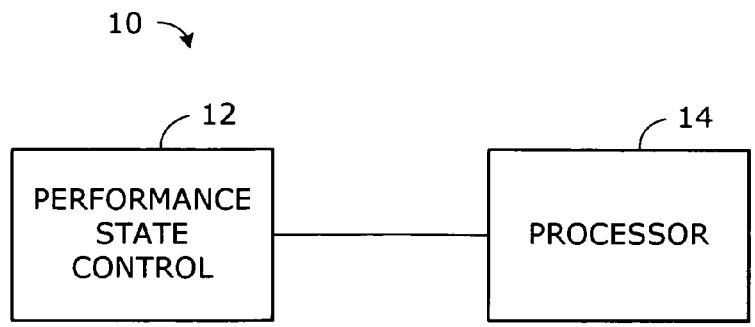
FIG. 1 is a block diagram of an electronic device utilizing power management in accordance with some embodiments of the present invention.

FIG. 1 is a block diagram of device 10 according to some embodiments. Device 10 includes performance state control 12 and processor 14. In some embodiments, performance state control 12 determines a performance characteristic of processor 14 that is associated with a workload executed by processor 14, and determines a processor performance state for the workload based on the performance characteristic.

Performance state control 12 may comprise any combination of hardware and/or software. According to some embodiments, performance state control 12 comprises operating system-level software executed by processor 14 to provide the functions described herein. Performance state control 12 may determine the above-mentioned performance characteristic by querying one or more operating system and processor performance counters before, during and/or after processor 14 executes the workload.

A performance characteristic may comprise any information that indicates an efficiency of processor 14 with respect to a workload and that may be obtained from hardware or software. Performance characteristics may include but are not limited to a level two cache miss ratio, an input/output queue depth, a number of retired instructions, input/output throughput and latency, and memory access rate. A workload as described herein may comprise an operating system-level thread, a device driver, a task, an application, a thread of a multi-threaded application, and/or any other executable process for which performance characteristics may be determined.

Processor 14 may comprise any number of processing units. Processor 14 comprises a microprocessor integrated circuit (IC) in some embodiments. Processor 14 may support multiple controllable operational power and performance states. According to some embodiments, processor 14 supports the Advanced Configuration and Power Interface (ACPI) Specification Revision 2.0b (October, 2002), which defines a number of power and performance states.

In some embodiments, performance state control 12 may be implemented in a memory storing processor-executable program code. For example, the processor 14 may be in communication with the memory and operative in conjunction with the stored program code to determine a processor performance characteristic associated with a workload, determine a workload characteristic associated with the workload, and determine a processor performance state for the workload based on the performance characteristic and the workload characteristic. The processor may be further operative in conjunction with the stored program code to execute the workload at the processor performance state.

In some embodiments, to determine the workload characteristic the processor may be further operative in conjunction with the stored program code to identify an off-die phase in the workload. Non-limiting examples of off-die phases included a memory access, a snooping activity, an inter-processor communication and a blocking input/output operation.

In some embodiments, to determine the workload characteristic the processor may be further operative in conjunction with the stored program code to determine that the workload is memory bound in accordance with an amount of instruction level parallelism for the workload. For example, the processor may be further operative in conjunction with the stored program code to determine that the workload is memory bound in accordance with an amount of instruction level parallelism and a number of active input/output queue entries for the workload. For example, the workload may be determined to be memory bound with less active queue entries for lower amounts of instruction level parallelism.

In some embodiments, to determine the workload characteristic the processor is further operative in conjunction with the stored program code to read a performance counter and determine a number of stalled cycles based on the performance counter. In some embodiments, the processor may further operative in conjunction with the stored program code to determine a number of input/output queue events, determine a number of retired instructions, and/or determine that the workload is memory bound in accordance with the number of input/output queue events and the number of retired instructions.

In some applications, P-states and C-states available in conventional processors may provide an effective mechanism to reduce CPU power. For example, C-states may allow progressively shutting down CPU clocks and logic when a processor is idle. P-states may provide different voltage/frequency levels to the operating system and may be used to scale processor performance based on demand. Operating systems may control frequency/voltage scaling by monitoring the utilization of a processor and adjusting its performance level when demand changes. While these mechanisms may be effective at reducing CPU power at low utilization, very little benefit may be provided when the demand is high. In addition, a utilization based policy may not account for how efficiently the hardware is executing a workload, which might result in wasted power consumption and low performance efficiency for some workloads.

Advantageously, some embodiments of the present invention may provide a method and/or apparatus for managing CPU power based on performance efficiency of the microarchitecture. For example, when a CPU is stalled accessing memory, executing a workload at higher frequencies or performance states provides little performance benefit and leads to high power consumption and low performance efficiency. Some embodiments of the invention may provide a method for identifying memory bound phases of workload execution and a CPU power management policy that performs P-state management based on processor performance efficiency.

Figure 2:
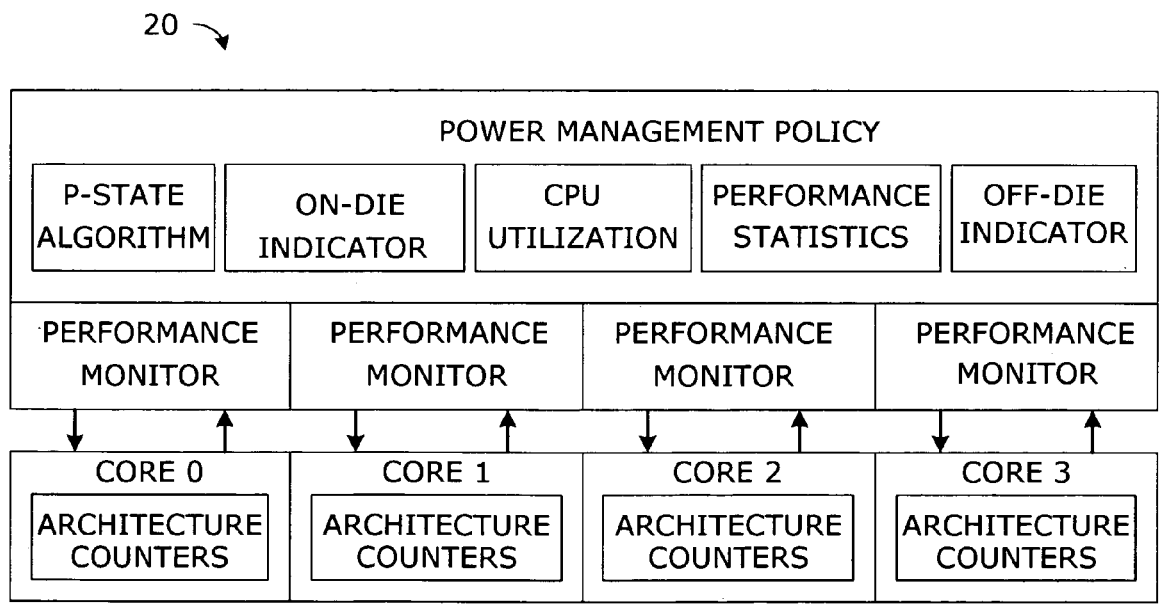
FIG. 2 is a block diagram of an electronic system in accordance with some embodiments of the present invention.

With reference to FIG. 2, a system 20 may utilize an OS power management policy which is augmented with performance monitors that monitor workload execution and identify when workload is memory bound. The policy may use workload characteristics provided by performance monitors in addition to processor utilization to determine an efficient performance state (e.g. a most efficient performance state) that reduces or minimizes processor power while maintaining performance within a specified bound.

Some embodiments of the invention involve identifying off-die phases of a workload. For example, a workload execution may be divided into two types of phases, namely, on-die and off-die. In an on-die phase, a workload may be CPU bound, primarily using on-die resources and its performance may be driven by the CPU clock. In an off-die phase, a workload may have significant number of memory accesses (e.g. be memory bound) or other off-die transactions such as snooping activity and the CPU may be stalled due to lack of ILP (instruction level parallelism) in the workload. In off-die phases, workload performance may be driven mostly by the off-die clock. In any given application, a series of on-die and off-die phases may be observed. For example, a goal of the performance monitor in FIG. 2 may be to accurately identify when each phase begins and ends and to provide this information to the power management policy routine.

Some embodiments of the invention may use CPU performance events for workload phase identification. Performance counter support may vary across different processor architectures. As an example, some processors may provide performance events that can be used to determine the number of stalled cycles and the functional unit that caused the bottleneck. These events can be used to determine when and for how long the processor is stalled waiting for off-die activity (e.g. memory accesses). In contrast, other processor architecture may not support these events. In this case, it may not be possible to directly determine the number of stalled cycles caused by memory accesses. However, in accordance with some embodiments of the invention other performance events may be used for identifying off-die phases.

For example, some embodiments of the invention may use instructions retired (IR) and input/output queue (IOQ) events to identify when workload is in an off-die or memory bound phase. In general, an IOQ counter may be an example of architecture specific counter and an IR counter may be a more generally available counter. IOQ events may be counted every cycle when a certain number of memory accesses are outstanding. Using a memory bound workload as an example, by counting the number of IOQ events, the degree to which the workload is memory bound may be determined. Different workloads may become memory bound under different memory access patterns. For example, workloads with limited ILP become memory bound with one or two outstanding memory requests while workloads with greater amount of ILP become memory bound only when three or more outstanding memory requests are in the IOQ.

Figure 3:
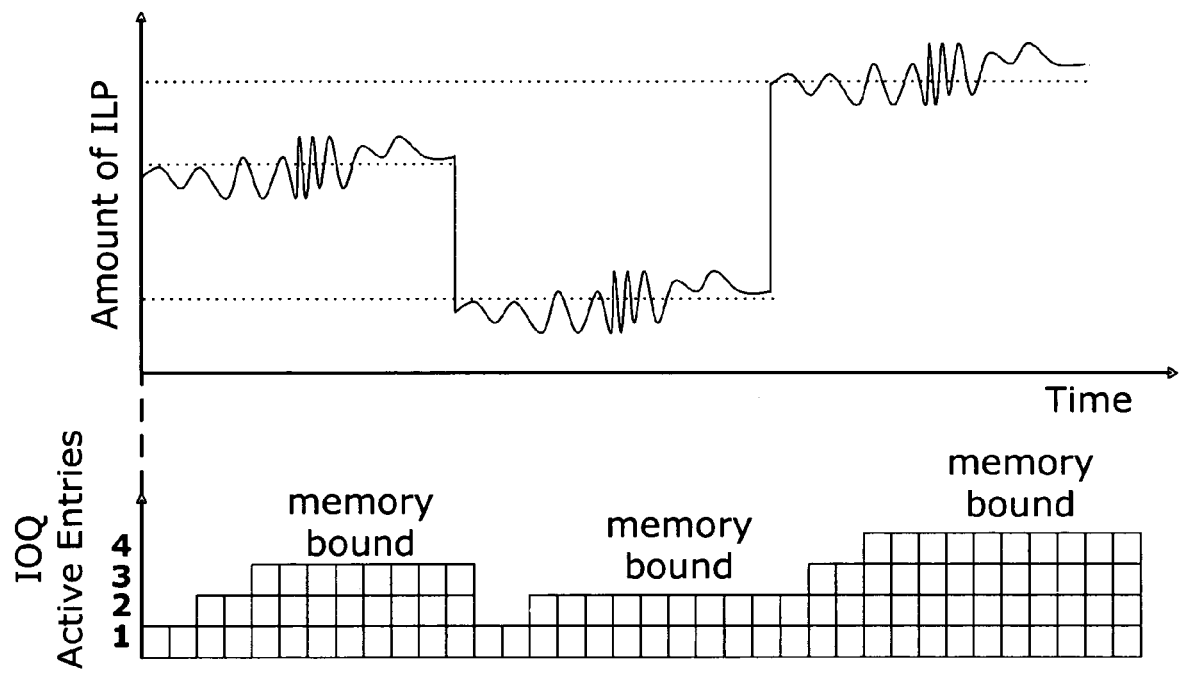
FIG. 3 is a graph in accordance with some embodiments of the present invention.

With reference to FIG. 3, an example graph of both the number of active IOQ entries and the amount of ILP versus time shows that workloads with less ILP may be considered memory bound with lower numbers of active IOQ entries. For example, a phase of a workload with a moderate amount of ILP may be considered memory bound with three active IOQ entries. Another phase of the workload with relatively less ILP may be considered memory bound with two active IOQ entries. Another phase of the workload with relatively more ILP may be considered memory bound with four active IOQ entries.

For example, a speculative sampling algorithm may be used to determine the level of IOQ residency that indicates when a particular phase of a workload is memory bound. Starting with the number of outstanding memory accesses set to one, the IOQ residency and instructions retired events may be monitored for a dynamically adjustable sampling interval. IOQ residency, the size of a sampling interval and instruction retired count may be passed to a policy manager (e.g. as described below) to determine if a workload has a workload characteristic of being memory bound. If the IOQ residency setting was selected correctly, it may continue to be used as an indicator of workload memory behavior. If, on the other hand, the policy manager determines that the IOQ residency setting was too low or too high, it may be adjusted in the next sampling interval. As shown in FIG. 3, the IOQ residency indicator may be regularly modified to adapt to changing workload behavior and identify when each phase of a workload may be memory bound.

Some embodiments of the invention may utilize a performance driven demand based switching (PD-DBS) power management policy (e.g. implemented in software). For example, the PD-DBS policy manager may be responsible for selecting a frequency level that meets workload performance requirements and reduces or minimizes processor power consumption. Workload performance requirements may be expressed in terms of performance degradation relative to the time it takes to execute a certain number of instructions at a maximum operating frequency defined as $T_0$ ($P_0$ is the performance state that corresponds to a maximum frequency/voltage setting). For a given workload phase, performance loss at lower processor frequency $f_i$ may be defined as a ratio of execution time in $P_0$ and $P_i$ states respectively:

$$PerfLoss = \frac{T_i}{T0} - 1$$

The time it takes to execute a sequence of instructions in a workload phase can be divided into cycles when the processor is retiring instructions and cycles when it is stalled waiting for memory or other off-die activity. Note that the latter time is not a function of processor frequency and thus is completely independent from it. The above equation may be rewritten in the following way:

$$PerfLoss = \frac{T_i^{on\text{-}die} + T_i^{off\text{-}die}}{T_0^{on\text{-}die} + T_0^{off\text{-}die}} - 1$$

Since $T_0^{off\text{-}die} = T_i^{off\text{-}die}$ and $$T_i^{on\text{-}die} = \frac{f_0}{f_i} T_0^{on\text{-}die}$$

the above equation becomes:

$$PerfLoss = \frac{T_0^{on\text{-}die} \frac{f_0}{f_i} + T_0^{off\text{-}die}}{T_0^{on\text{-}die} + T_0^{off\text{-}die}} - 1 = \frac{\frac{f_0}{f_i} - 1}{1 + \frac{T_0^{off\text{-}die}}{T_0^{on\text{-}die}}}$$

This equation captures the relationship between workload performance degradation and its off-die behavior. For example, as workload becomes more memory bound, $T_i^{off\text{-}die}$ time starts to dominate $T_i^{on\text{-}die}$ reducing performance loss of executing at a lower frequency. On the other hand, if workload execution doesn't result in memory stalls and $T_i^{off\text{-}die}$ is small the above equation can be reduced to $$\frac{f_0}{f_i} - 1$$

showing that performance loss scales perfectly with CPU frequency.

Given a certain level of performance loss the above equation can be re-arranged to determine target frequency for a given workload phase that minimizes energy consumption and maintains performance degradation with a specified performance bound:

$$f_{target} = \frac{f_0}{PerfLoss\left(1 + \frac{T_0^{off\text{-}die}}{T_0^{on\text{-}die}}\right) + 1}$$

As an example, suppose a phase of a workload is memory bound 90% of the time and performance loss is set to be within a 3% level. Then the above equation becomes:

$$f_{target} = \frac{f_0}{0.03(1+9)+1} = \frac{f_0}{1.3}$$

If $f_0$ is 3.6 GHz $f_{target}$ comes out to be 2.77 GHz indicating that executing this phase of a workload at this or higher frequency will maintain its performance within a specified PerfLoss threshold.

PD-DBS power management policy uses this equation to determine performance level that increases processor power efficiency and maintains acceptable level of performance. Referring to the discussion in the previous section, PD-DBS uses memory bound indicator to determine $T_i^{on\text{-}die}$ and $T_i^{off\text{-}die}$. It then uses the above equation to compute the lowest frequency provided by the processor that will keep workload execution within a specified performance bound and initiates P-state transition to the target frequency.

Note, that existing utilization based policy provides no mechanism for determining the impact of power management policy on workload performance. PD-DBS, on the other hand, not only ensures the most power efficient execution but also provides the ability for a system designer or end user to specify what maximum level of performance degradation is willing to accept to get more power efficient operation.

Selecting an appropriate off-die or memory bound indicator is described above for architectures that do not provide a direct way of identifying processor stalls that are caused by memory accesses or other off-die activity. On these architectures, off-die phase identification may be treated as an assumption and the validity of the assumption may be verified by regularly monitoring the number of retired instructions. Instructions retired, thereby enabling a determination of the actual performance degradation caused by a P-state transition.

As an example, after selecting the target frequency as shown in the equation above and transitioning a processor to a new P-state, the number of instructions retired may be monitored and compared to workload performance in the highest P-state. If a performance degradation observed is different from that computed by the equation above, the CPU may be transitioned to the highest performance state and an off-die phase indicator threshold may be updated (e.g. the memory bound indicator in FIG. 3). As was described in the previous section, this iterative process may be continued until a threshold setting is found that corresponds to workload off-die behavior (e.g. memory behavior).

Note further that instructions retired can be used as a very good indicator of changes in workload phase behavior. Instructions retired index remains unchanged within a given workload phase but fluctuates significantly as execution switches from one phase to another. As such, some embodiments of the invention for monitoring instructions retired and calibrating memory bound indicator work well not only within a workload phase but more importantly can also be used for detecting phase changes. Given a dynamic nature of workload execution characteristics the ability to detect and track phase changes allows PD-DBS policy to adjust its off-die indicator and effectively monitor workload behavior seamlessly across different phases during workload execution.

Some embodiments of the invention utilizing a performance driven demand based switching may provide one or more of the following benefits: 1) significantly improves performance efficiency and power savings for off-die bound workloads; 2) power savings may be achieved both at high and low utilizations; 3) a performance driven policy that may limit performance degradation of a workload to a specified threshold.

Figure 4:
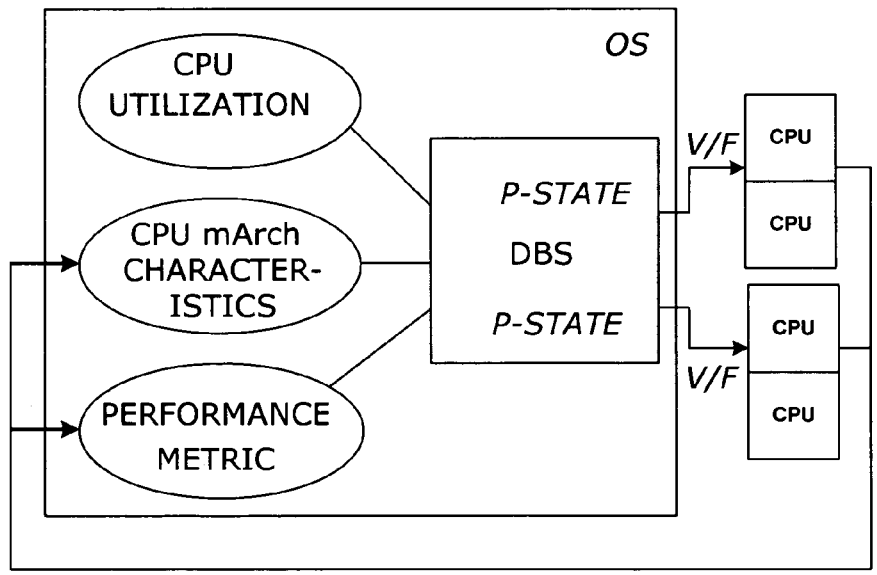
FIG. 4 is a block diagram of another electronic system in accordance with some embodiments of the present invention.

FIG. 4 shows a general architecture of some embodiments of the present invention. An OS power management policy may use processor utilization, workload characteristics and performance metrics to select a more or most efficient performance state (e.g. a P-state which may be expressed with voltage/frequency level V/F). The policy may also use a closed feedback loop to measure off-die activity and core performance to regularly refine the P-state decisions.

Figure 5:
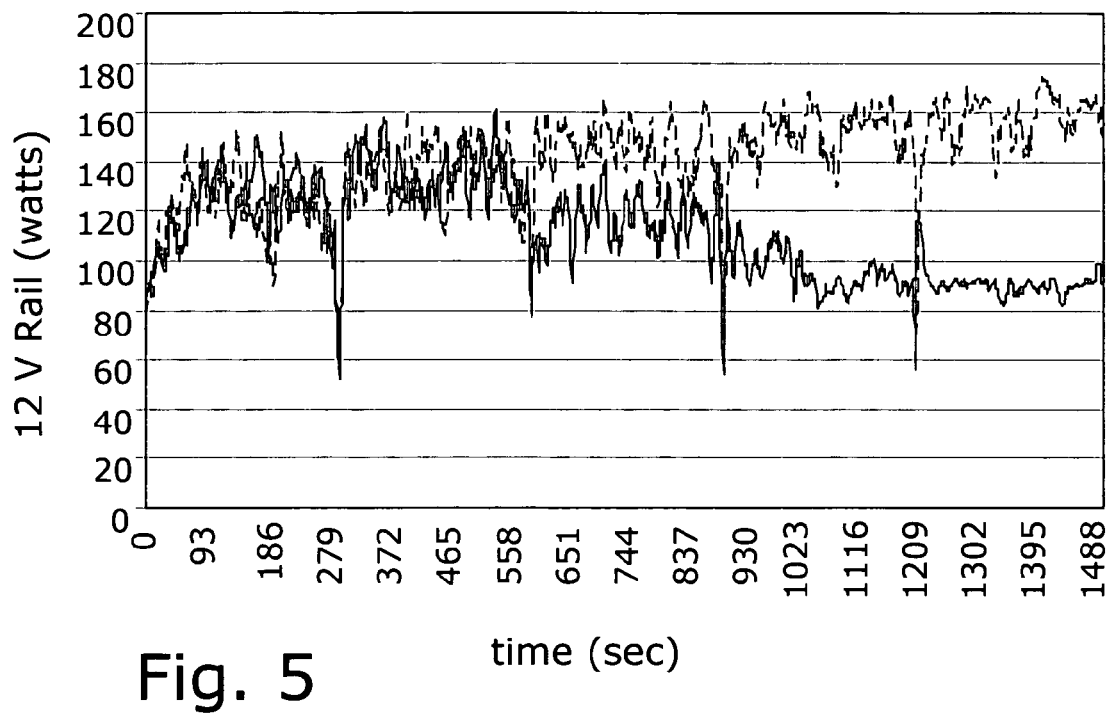
FIG. 5 is a comparison graph of power versus time, in accordance with some embodiments of the invention.

FIG. 5 shows an example processor power consumption on a system running a server workload with (solid line) and without (dashed line) a power management policy in accordance with some embodiments of the invention. As can be seen from FIG. 5, the solid line indicates power savings over the baseline case.

Figure 6:
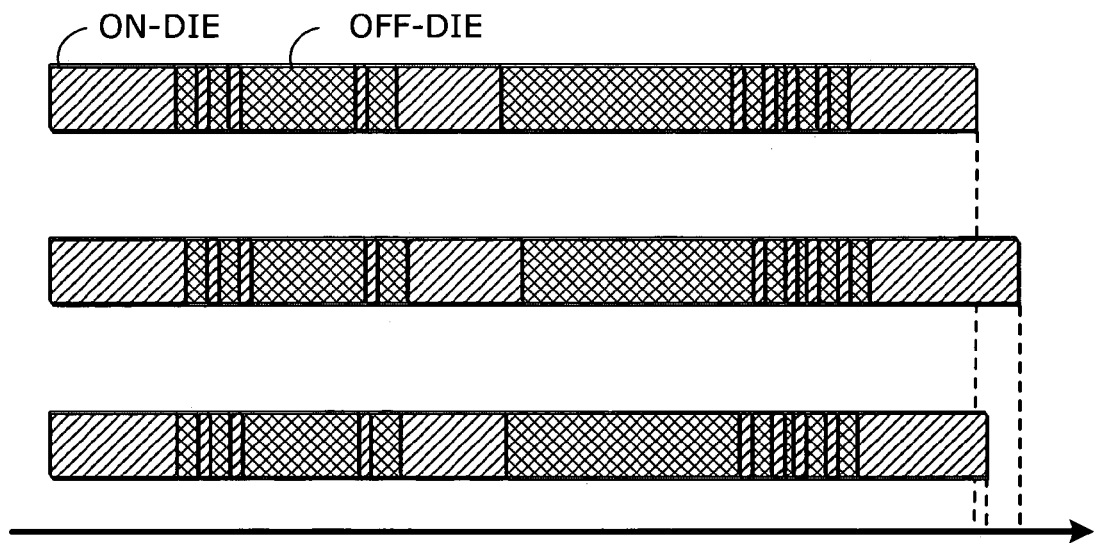
FIG. 6 is a comparison graph of execution times, in accordance with some embodiments of the invention.

FIG. 6 shows an example of how off-die activity can be used to save power in accordance with some embodiments of the invention. The top diagram represents a DBS policy where P-state residency is driven only by CPU utilization (P0). The middle diagram represents DBS Off policy and the CPU is in low power/performance state (P2). The bottom diagram represents a PD-DBS policy: on-die phase: P0 off-die phase: P2. The dashed lines show relative completion times of the executed workload. Because off-die operations may not scale with processor frequency, workloads executing in an off-die phase may be run in a lower performance state without significantly impacting overall system performance. The diagram also shows that simply setting processor performance to the lowest performance state will impact system performance since on-die phases are executed at lower frequency.

Figure 7:
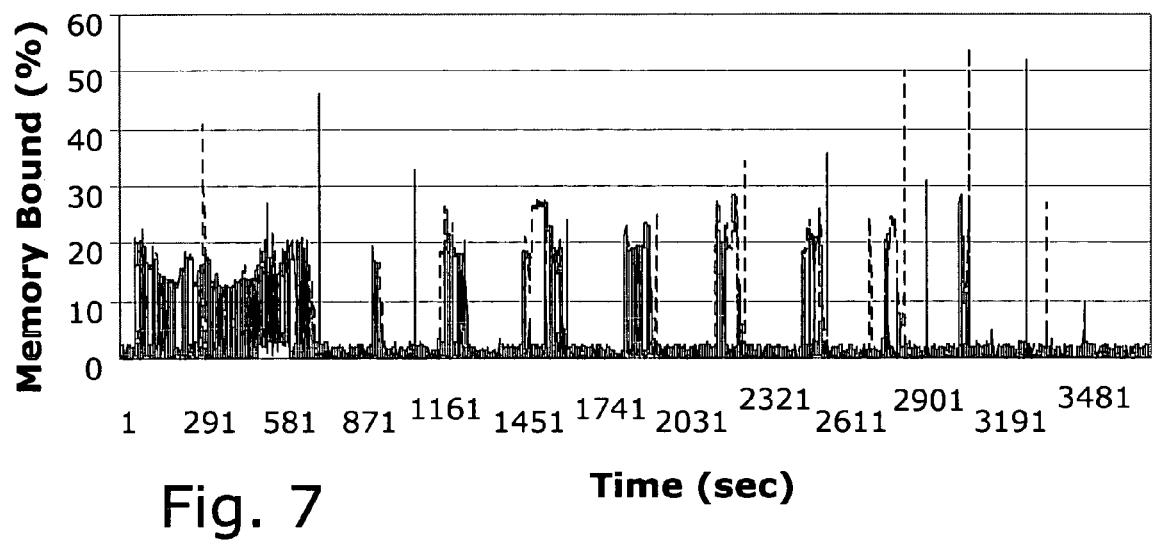
FIG. 7 is a graph of percentage memory bound versus time in accordance with some embodiments of the present invention.
Figure 8:
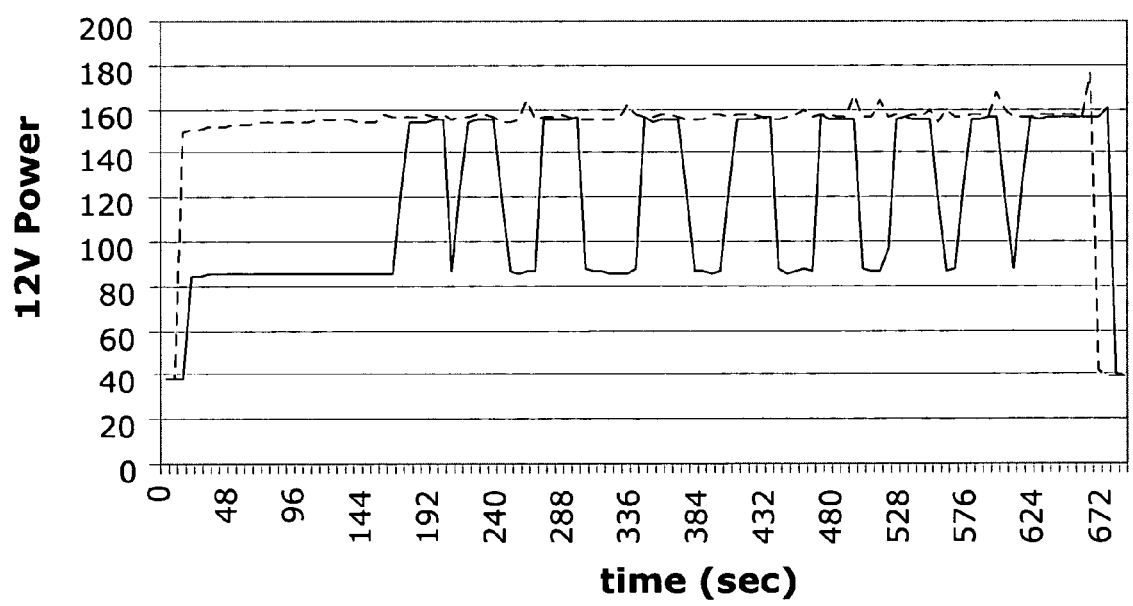
FIG. 8 is a comparison graph of power versus time, in accordance with some embodiments of the invention.

FIG. 7 shows an example of workload memory behavior with clearly defined phases of off-die execution. FIG. 8 shows how, by using some embodiments of the present invention, processor power may be saved during these off-die phases with the solid line showing periods of lower power during off-die phases.

Figure 9:
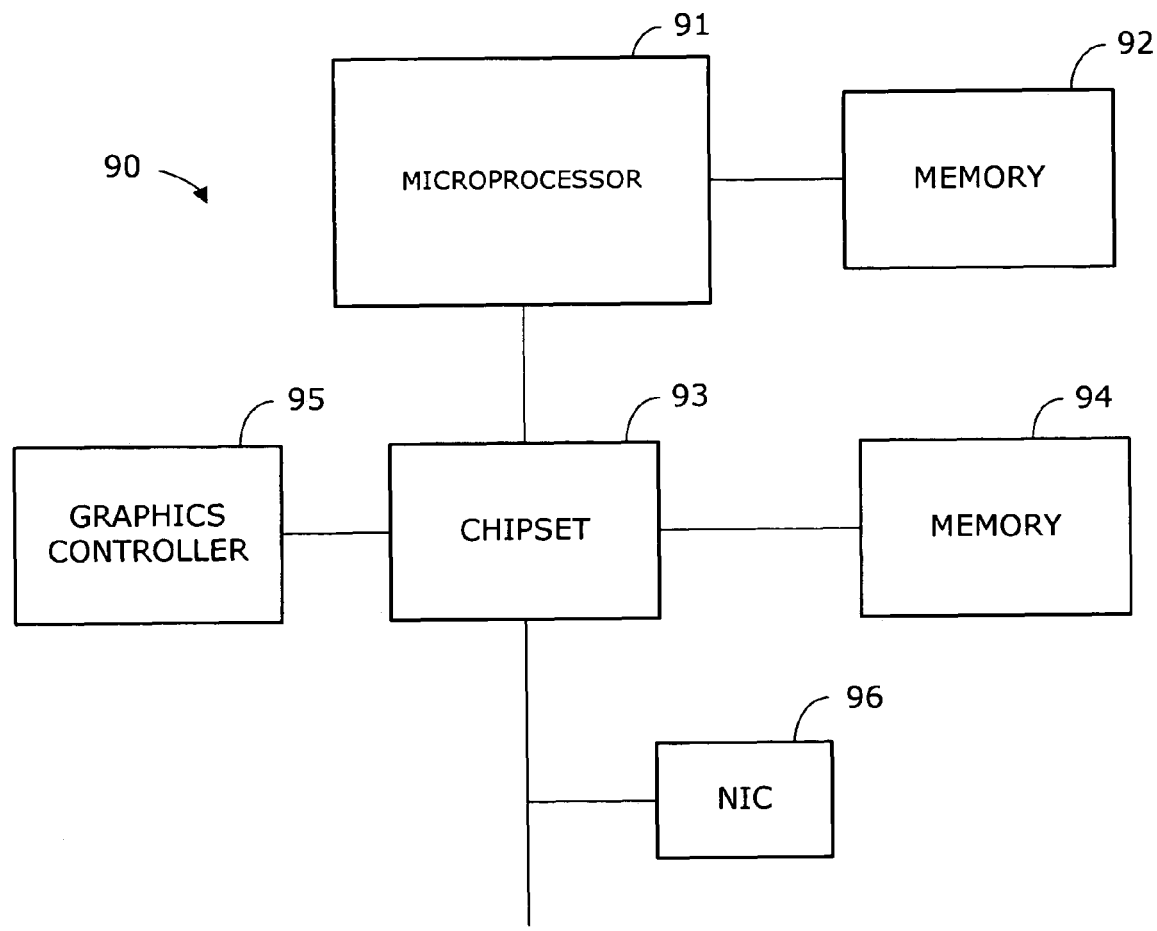
FIG. 9 is a block diagram of another electronic system in accordance with some embodiments of the present invention.

FIG. 9 illustrates a block diagram of system 90 according to some embodiments. System 90 includes microprocessor 91 which may comprise a Pentium®, RISC-based, or other type of processor. Microprocessor 91 may communicate directly with system memory 92, which may comprise any type of memory including but not limited to Single Data Rate Random Access Memory and Double Data Rate Random Access Memory. Program code may be executed by microprocessor 91 from memory 92 to perform the methods described herein. Microprocessor 91 may communicate with chipset 93 and with other off-die functional units, such as memory 94, graphics controller 95 and Network Interface Controller (NIC) 96 via chipset 93.

The aforementioned program code may be read from a computer-readable medium, such as a floppy disk, a CD-ROM, a DVD-ROM, a Zip™ disk, a magnetic tape, or a signal encoding the process steps, and thereafter stored in memory 94 in a compressed, uncompiled and/or encrypted format. In alternative embodiments, hard-wired circuitry may be used in place of, or in combination with, program code for implementation of the processes described herein. Thus, embodiments are not limited to any specific combination of hardware and software.

Although ACPI performance states have been used herein as an example, embodiments may be associated with any type of selectable processor performance state. Moreover, although specific components have been described as performing specific functions, any of the functions described herein might be performed by a software application, a hardware device, an OS, a driver, and/or a BIOS.

Figure 10:
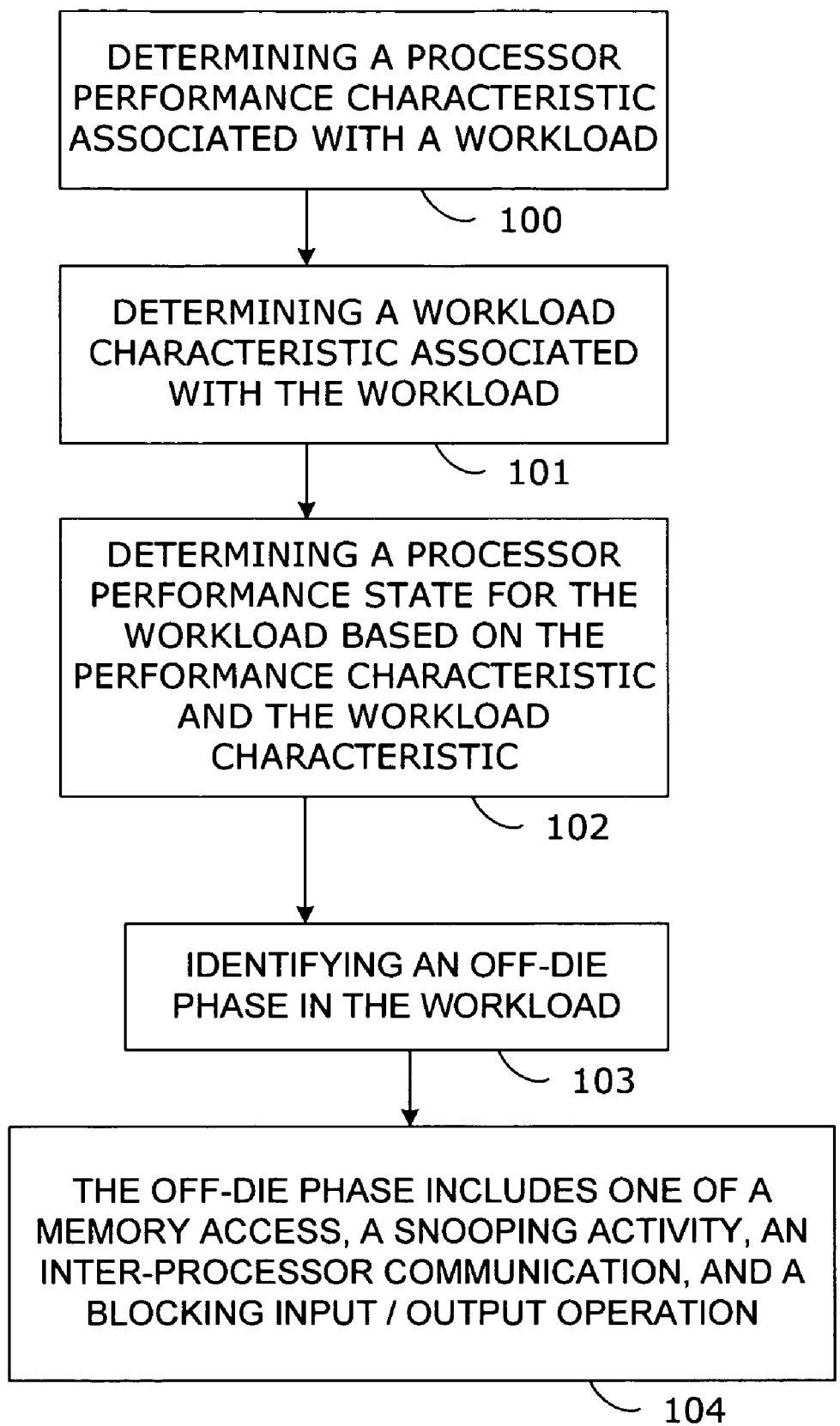
FIG. 10 is a flow diagram in accordance with some embodiments of the invention.

With reference to FIG. 10, some embodiments of the invention may involve determining a processor performance characteristic associated with a workload (e.g. at block 100), determining a workload characteristic associated with the workload (e.g. at block 101), and determining a processor performance state for the workload based on the performance characteristic and the workload characteristic (e.g. at block 102). For example, determining the workload characteristic may include identifying an off-die phase in the workload (e.g. at block 103). For example, the off-die phase may include one of a memory access, a snooping activity, an inter-processor communication, and a blocking input/output operation (e.g. at block 104).

Figure 11:
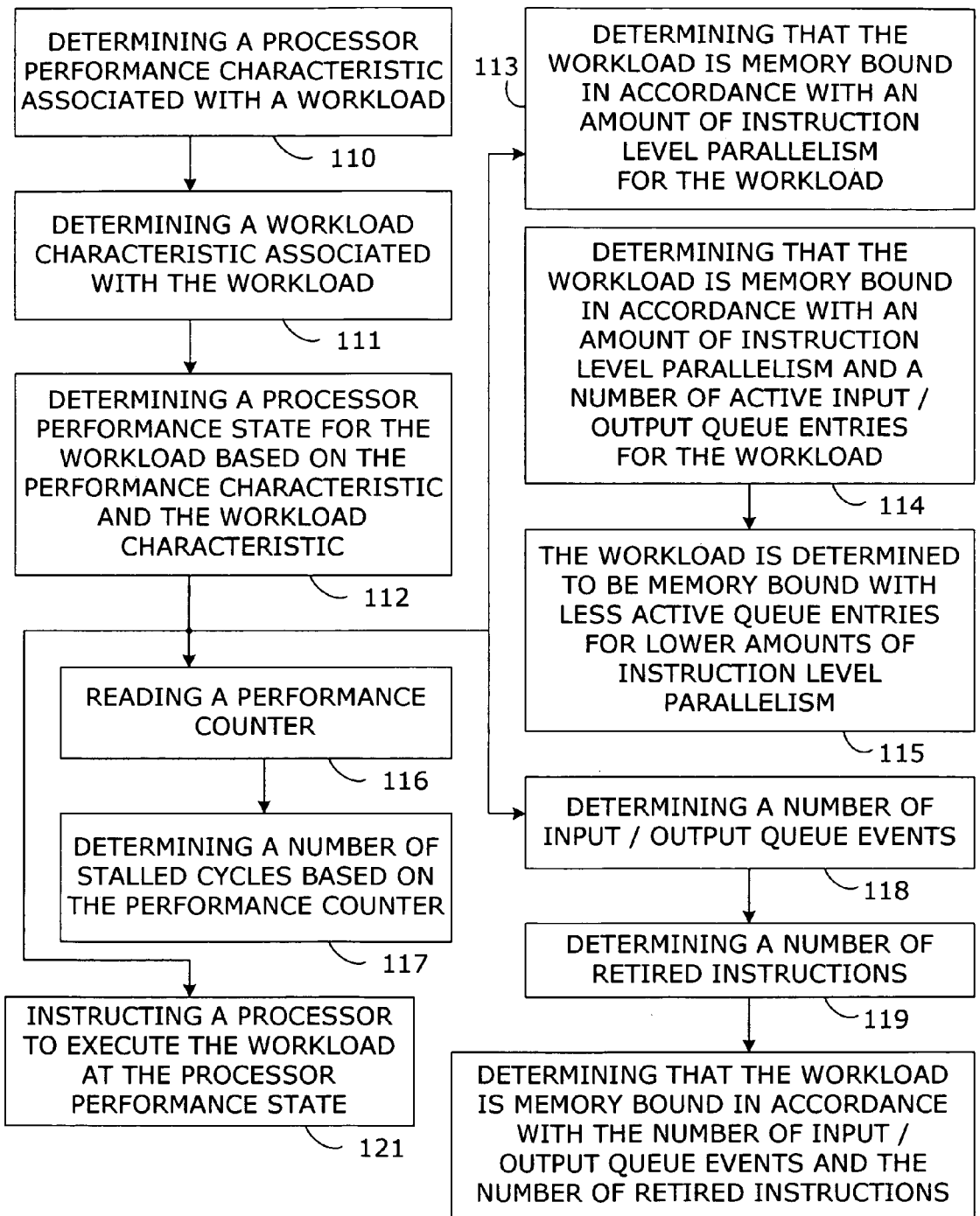
FIG. 11 is another flow diagram in accordance with some embodiments of the invention.

With reference to FIG. 11, some embodiments of the invention may involve determining a processor performance characteristic associated with a workload (e.g. at block 110), determining a workload characteristic associated with the workload (e.g. at block 111), and determining a processor performance state for the workload based on the performance characteristic and the workload characteristic (e.g. at block 112). For example, determining the workload characteristic may include determining that the workload is memory bound in accordance with an amount of instruction level parallelism for the workload (e.g. at block 113). For example, determining the workload characteristic may include determining that the workload is memory bound in accordance with an amount of instruction level parallelism and a number of active input/output queue entries for the workload (e.g. at block 114). The workload may be determined to be memory bound with less active queue entries for lower amounts of instruction level parallelism (e.g. at block 115).

In some embodiments, determining the workload characteristic may include reading a performance counter (e.g. at block 116) and determining a number of stalled cycles based on the performance counter (e.g. at block 117). In some embodiments, determining the workload characteristic may include determining a number of input/output queue events (e.g. at block 118), determining a number of retired instructions (e.g. at block 119), and/or determining that the workload is memory bound in accordance with the number of input/output queue events and the number of retired instructions (e.g. at block 120). Some embodiments may further involve instructing a processor to execute the workload at the processor performance state (e.g. at block 121).

Figure 12:
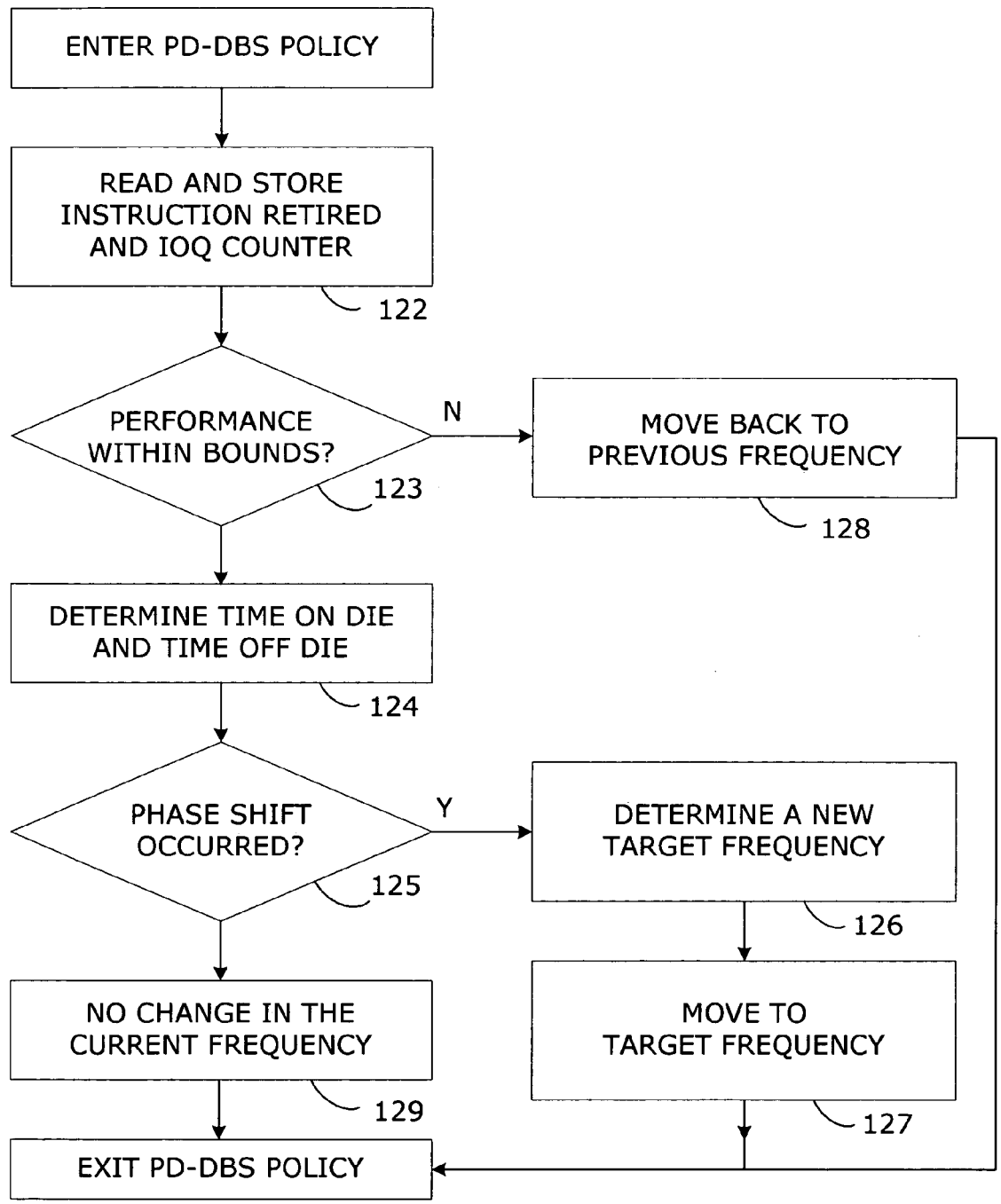
FIG. 12 is another flow diagram in accordance with some embodiments of the invention.

With reference to FIG. 12, some embodiments of the invention may involve entering a PD-DBS power management policy, determining a number of retired instructions and a number of input/output queue events for a workload (e.g. at block 122), determining if a performance characteristic is within a desired performance range based at least in part on the number of retired instructions and the number of input/output queue events (e.g. at block 123), if the performance characteristic is within the desired performance range, determining an amount of time on die and an amount of time off die for the workload (e.g. at block 124), determining if a phase shift occurred based on the amount of time on die and the amount of time of die (e.g. at block 125), and if the phase shift occurred, determining a new target frequency for a processor to execute the workload (e.g. at block 126).

For example, determining a number of retired instructions and a number of input/output queue events for a workload (e.g. at block 122) may include reading and storing an IOQ counter and/or an instruction retired counter. For example, determining if a performance characteristic is within a desired performance range based at least in part on the number of retired instructions and the number of input/output queue events (e.g. at block 123) may include comparing a current IR count to a previous IR count plus or minus a threshold amount (which may be a percentage of maximum performance).

Some embodiments may further involve setting an operating frequency of the processor to the new target frequency (e.g. at block 127). For example, the new target frequency may be determined in accordance with a desired amount of acceptable performance degradation. Some embodiments may further involve, if the performance characteristic is not within the desired performance range, setting an operating frequency for the processor to execute the workload back to a previous frequency (e.g. at block 128).

If no phase shift occurred at block 125, there may be no change in the current frequency (e.g. at block 129). After each of blocks 127, 128 and 129, the routine may exit the power management policy.

Those skilled in the art will appreciate that the flow diagrams of FIGS. 10-12 may be implemented in any of a number of arrangements of hardware, software, and/or firmware. For example, the flow diagram may be completely implemented by special purpose hardware circuits. Alternatively, the flow diagram may be completely implemented by software running on a general purpose processor. Alternatively, the flow diagram may be selectively partitioned between special purpose hardware and software running on a general purpose processor.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A method of adjusting an operating frequency for a processor, comprising:
   executing a workload with a processor;
   determining a number of retired instructions and a number of input/output queue events for a workload;
   determining if a performance characteristic is within a desired performance range based at least in part on the number of retired instructions and the number of input/output queue events;
   if the performance characteristic is within the desired performance range, determining an amount of time on die and an amount of time off die for the workload;
   determining if a phase shift occurred based on the amount of time on die and the amount of time of die; and
   if the phase shift occurred, determining a new target frequency for a processor to execute the workload.

2. The method of claim 1, further comprising:
   setting an operating frequency of the processor to the new target frequency.

3. The method of claim 2, wherein the new target frequency is determined in accordance with a desired amount of acceptable performance degradation.

4. The method of claim 1, further comprising:
   if the performance characteristic is not within the desired performance range, setting an operating frequency for the processor to execute the workload back to a previous frequency.

5. An electronic system, comprising:
   a memory storing processor-executable program code; and
   a processor in communication with the memory and operative in conjunction with the stored program code to:
      determine a number of retired instructions and a number of input/output queue events for a workload;
      determine if a performance characteristic is within a desired performance range based at least in part on the number of retired instructions and the number of input/output queue events;
      if the performance characteristic is within the desired performance range, determine an amount of time on die and an amount of time off die for the workload;
      determine if a phase shift occurred based on the amount of time on die and the amount of time of die; and
      if the phase shift occurred, determine a new target frequency for a processor to execute the workload.

6. The electronic system of claim 5, wherein the processor in communication with the memory is further operative in conjunction with the stored program code to:
   set an operating frequency of the processor to the new target frequency.

7. The electronic system of claim 6, wherein the new target frequency is determined in accordance with a desired amount of acceptable performance degradation.

8. The electronic system of claim 5, wherein the processor in communication with the memory is further operative in conjunction with the stored program code to:
   if the performance characteristic is not within the desired performance range, set an operating frequency for the processor to execute the workload back to a previous frequency.

* * * * *